United States Patent [19]

Burke

[11] Patent Number: 5,621,640
[45] Date of Patent: Apr. 15, 1997

[54] AUTOMATIC PHILANTHROPIC CONTRIBUTION SYSTEM

[75] Inventor: Bertram V. Burke, No. Plainfield, N.J.

[73] Assignee: Every Penny Counts, Inc., Navesink, N.J.

[21] Appl. No.: 349,353

[22] Filed: Dec. 5, 1994

Related U.S. Application Data

[63] Continuation of Ser. No. 18,821, Feb. 18, 1993, abandoned.

[51] Int. Cl.$^6$ .............................. G06G 1/12; G06G 7/52; G06G 1/14; G06F 17/60
[52] U.S. Cl. .......................... 395/214; 235/375; 235/379; 902/22; 902/24; 902/41; 395/230; 395/242
[58] Field of Search ..................................... 235/375, 379, 235/380; 364/461 R, 405, 406, 408; 902/22, 24, 41

[56] References Cited

U.S. PATENT DOCUMENTS 3,833,885   9/1974   Gentile et al. ........................... 235/379
4,355,369  10/1982   Garvin ..................................... 235/379
4,607,335   8/1986   Mizuno .................................... 364/405
4,673,802   6/1987   Ohmae et al. ........................... 235/379
5,111,395   5/1992   Smith et al. ............................. 364/408
5,220,501   6/1993   Lawlor et al. ........................... 364/408
5,253,345  10/1993   Fernandes et al. ...................... 395/275
5,339,239   8/1994   Manabe et al. ......................... 364/401

OTHER PUBLICATIONS

*Contributor's Brochure*; Combined Federal Campaign; 1990, pp. 12–15.

Primary Examiner—Donald E. McElheny, Jr.
Assistant Examiner—Stephen R. Tkacs
Attorney, Agent, or Firm—Leo Stanger

[57]   ABSTRACT

An automatic donation system for a sales establishment includes an entry arrangement for entering the price of a product into a cash register and for entering the amount of cash being paid and a calculator for determining the excess cash payment. A card reader keypad receives a card number for accessing data including charity accounts concerning the card, and a computer apportions at least a part of the excess cash payment among said accounts, and then prints out the amounts entered.

30 Claims, 7 Drawing Sheets

AUTOMATIC PHILANTHROPIC CONTRIBUTION SYSTEM

This is a continuation of application Ser. No. 08/018,821, filed Feb. 18, 1993 now abandoned.

BACKGROUND OF THE INVENTION

This invention relates to methods and means for conveniently and frequently donating to qualified charities and savings or other accounts in small amounts, and particularly to an organized collection and recording system.

In current shopping situations a clerk inputs the price of all items in a cash register and the latter totals the price. The consumer offers either the exact amount of cash or a sum exceeding the price, and the clerk enters that amount. The cash register then subtracts the price from the cash.

The excess cash offers the customer an opportunity to save small amounts of money painlessly. It also affords the consumer to donate small amounts of money to charity. In fact, establishments sometimes display advertisements with receptacles for deposit of small change to be donated to charities. However these systems do not give the consumer an opportunity to save and donate his or her money consistently with respect to a favorite charity and fail to keep adequate records if the amounts grow enough to make it worthwhile to consider the tax implications of the contributions.

An object of the invention is to provide an organized collection and recording system that provides consumers, even small children, with the ability to donate to qualified charities, and have donor cards capable of storing electronic credits.

SUMMARY OF THE INVENTION

According to a feature of the invention, this object is attained in a system with entry means for entering the price of a product into a cash register and for entering the amount of cash being paid, calculating means for determining the excess cash payment, means for entering a card number and accessing data including accounts concerning the card, apportioning means for apportioning at least a part of the excess cash payment among said accounts, and printout means for printing out the amounts entered.

The invention provides card holders with the ability to save petty cash, have immediate access to the cash, donate to qualified charities, and have the ability to store electronic credits.

According to an embodiment, the invention is available in a wide variety of establishments including retail establishments, restaurants, convenience store, vending machines, entertainment venues, etc.

These and other features of the invention are pointed out in the claims. Other objects and advantages of the invention will become evident when read in light of the accompanying drawings.

DETAILED DESCRIPTION OF PREFERRED EMBODIMENTS

Figure 1:
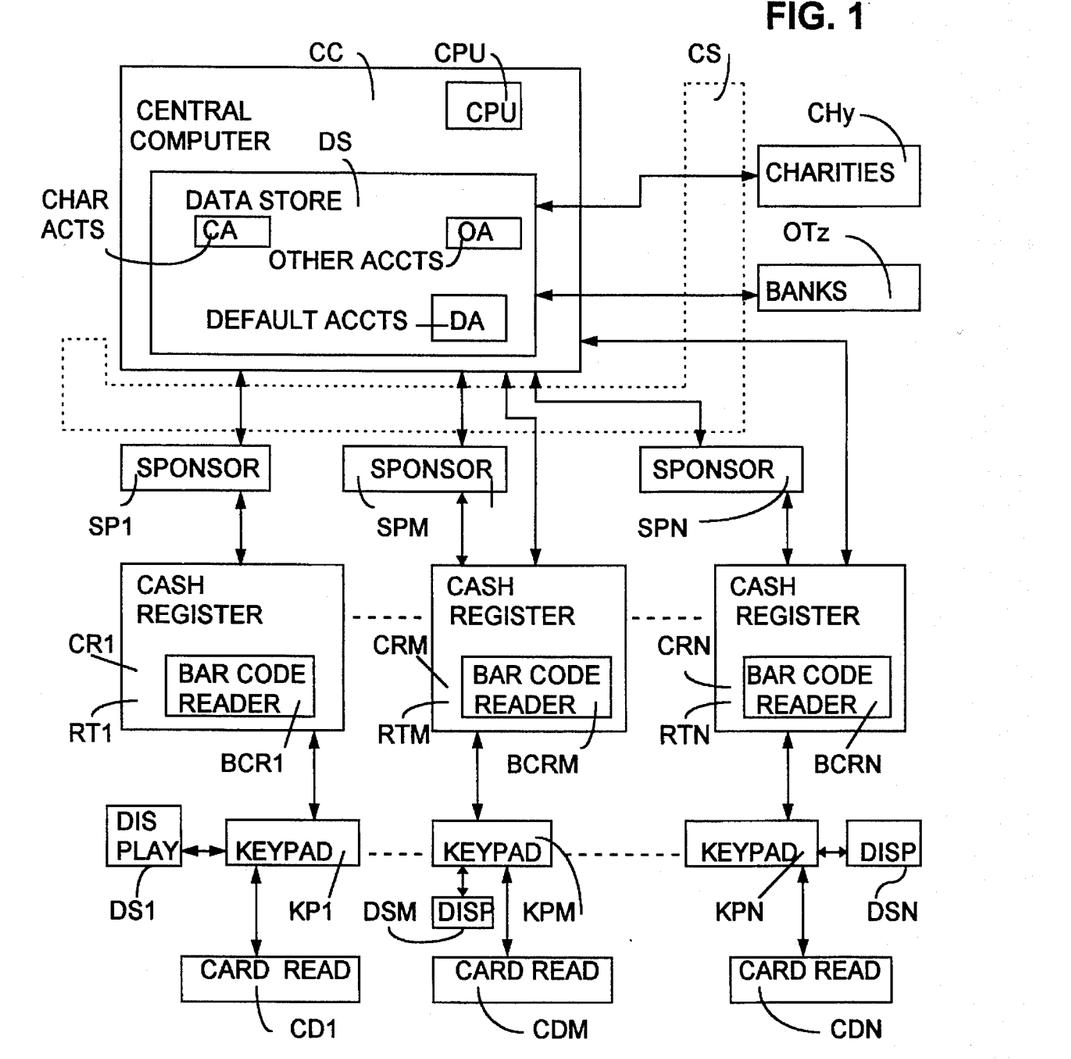
FIG. 1 is a block diagram of a system embodying features of the invention.

In FIG. 1, a system embodying the invention includes a central computer CC containing a central processor CPU and a large data storage DS. A communications system CS that may include telephone lines, satellites, or cables connects the central computer CC to a number of cash registers CRx (where x=1, ... M, ... N) in retail outlets, such as shops, supermarkets, gasoline stations, department stores, etc. at locations remote from the central computer. Throughout this specification, the term x, when appended to the end of a reference character, is equal to 1, ... M, ... N.

The cash registers CRx connect to respective keypads KPx and card readers CDx. Each cash register CRx, keypad KPx, and card reader CDx connected to each other represents a remote terminal RTx. For each cash register CRx there is a sponsor terminal STx that connects to the register and the central computer CC. Money is collected at the cash registers CRx for crediting to the consumers' ledgers in the accounts of various charities and other institutions such as banks, debit card issuers, credit card issuers, etc. The data storage DS contains individual storages for charity accounts CA and other accounts OA, such as for banks etc., all with ledgers for individual consumers.

The communications system CS also connects the central computer CC to charity computers CHy and other computer OTz, where y=1 ... k, and z=1 ... j such as bank computers and various charities such as debit account holders, credit card issuers, etc. These charities and other institutions are the ultimate receivers of the donations and deposits moneys collected at the cash registers CRx. The computer CC also includes a default account DA with consumer ledgers to hold moneys not otherwise allocated.

The cash register CRx includes a change display for exhibiting cash transactions, credit cards, or check purchases. The display automatically operates to show numbers in question. A card reader CDx with a keypad KPx allows the donor or clerk to enter the donation directly. The keypad KPx permits the donor to change the allocation for this transaction alone, or of permanently. The keypad KPx also allows the donor to reduce the amount donated so that he can receive cash change. The terminal RTx reports the donation directly to the central computer CC via the communication system CS. The central computer CC prints out periodic reports for interested parties on a need-to-know basis.

According to the invention, a consumer in a shop, supermarket, gasoline station, department store, etc. selects the desired merchandise and bring them to a clerk. The clerk inputs the price of all items in a cash register CRx by way of a register keyboard or a bar code reader and the register totals the price. The consumer then offers the clerk either the exact amount of cash or a sum exceeding the price, and the clerk enters that cash and the amount into the cash register. The cash register CRx then subtracts the price from the cash.

If the consumer gives the clerk the exact price nothing more need happen. However, if the money offered the clerk exceeds the price, the consumer may, if he or she wishes, choose to receive the change or to donate or save all or a portion of the change. To do the latter, he or she enters a donor card number into the keypad KPx or enters the donor card itself into the card reader CDx. The latter reads the number from a bar code or magnetic stripe on the card. The consumer cart also enter into the keypad how much of the total change he or she is to receive should be credited to various predetermined accounts in the central computer CC. The register CRx reads the numbers entered into the keyboard or the number entered by way of the card reader CDx.

Figure 2:
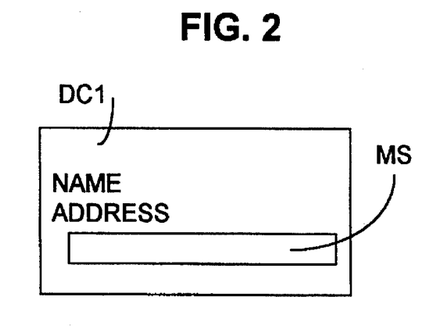
FIGS. 2 and 3 are views of credit cards forming part of the embodiment in FIG. 1.
Figure 3:
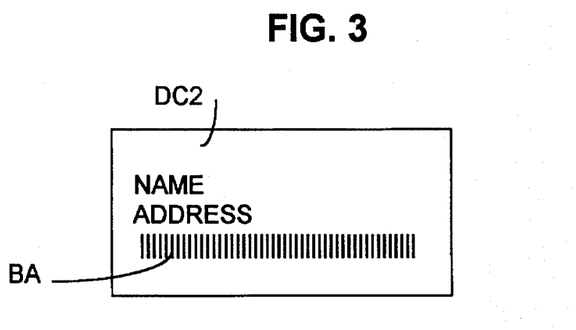

A donor card DC1 according to the invention appears in FIG. 2 with a magnetic stripe MS carrying the donor's number. A card DC2 in FIG. 3 includes the number in the form of a bar code BA.

After receiving the data, the register CRx accesses the central computer CC. The latter allocates the change, or portion of the change selected by the consumer, among various charity accounts CA and other accounts OA in the computer CC according to the preprogrammed commands which the consumer has previously entered into the central computer. The consumer receives a printout of all donor transactions as well as the just-completed commercial transaction.

If desired, the consumer can choose to donate only a fraction of the difference between the cash presented and the price. The consumer then enters the amount to be donated and receives the appropriate cash change.

According to an embodiment of the invention, with every transaction, the computer CC electronically transfers all amounts allocated to each charity CHy, immediately or as soon as the computer can access the charity computer. In this way the donor is always assured that the contribution takes effect immediately. Deposits in the other accounts OA may be sent immediately or held until a sufficient amount is accumulated to be acceptable by the other institutions.

An example of the operation of a cash register CRx, keypad KPx, and card reader CDx appears in the flow chart of FIGS. 4, 4A, 5, and 5A. Here, it is assumed that the customer is purchasing merchandise that may carry bar codes. However, the invention is also applicable for purchase of services, rentals, or other valuables.

Figure 4:
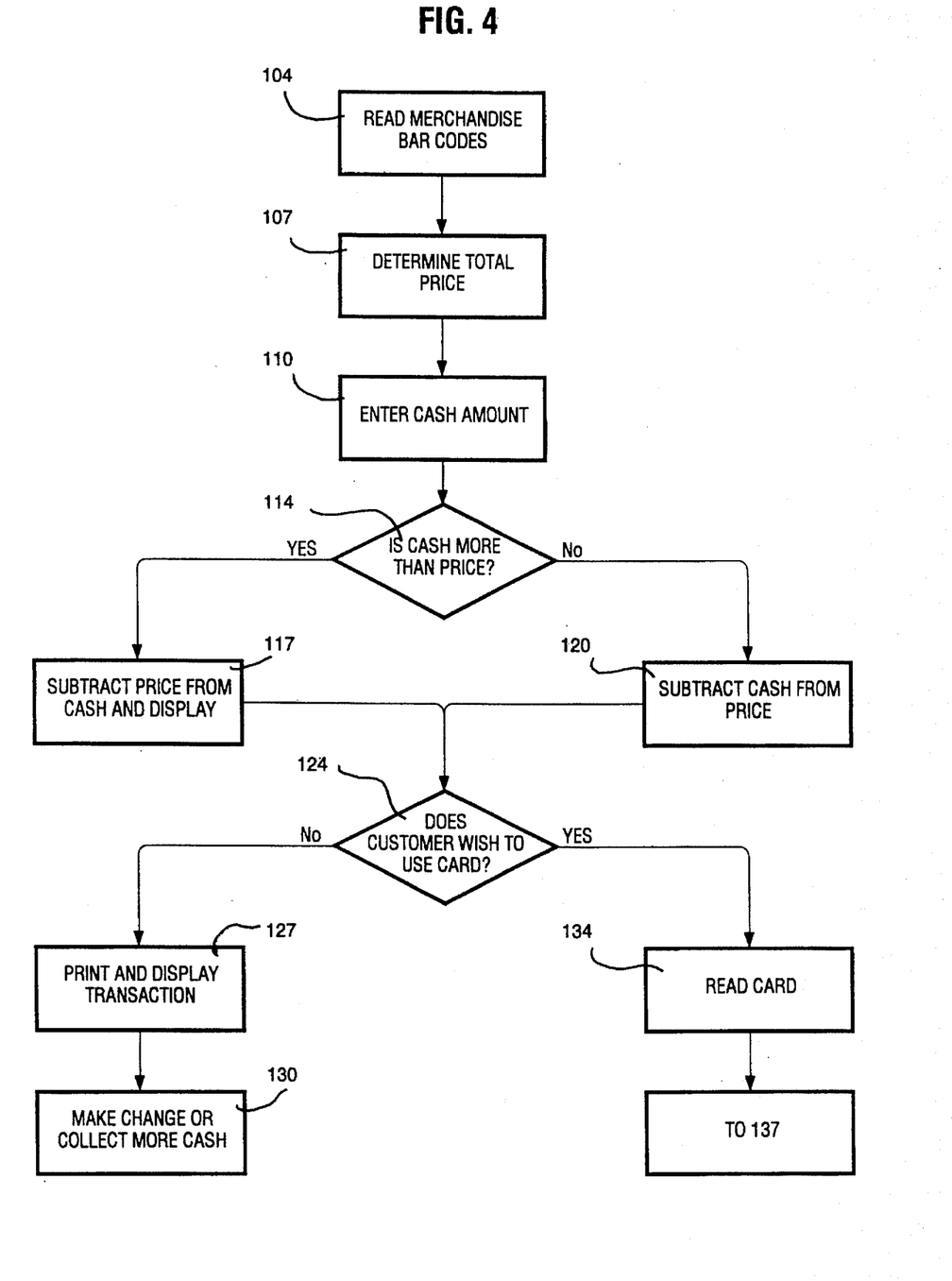
FIGS. 4, 4A, 5, and 5A are consecutive flow diagrams of the steps that take place in FIG. 1.

In step 104 of FIG. 4, the clerk enters the prices of the various pieces of merchandise, either by way of a keyboard (not shown) or a bar code reader BCRx, into the cash register CRx. In step 107, the cash register determines the total price. The customer then gives the clerk the cash to cover or exceed the total price. While this example refers to cash, the invention is also applicable to payment by credit card. That is, the customer may wish to have an amount charged to the credit card in excess of the price in order to make donations or distributions according to the invention. For purposes of this description the word cash is used also to embrace credit card payments.

In step 110, the clerk then enters the amount of the cash payment into the cash register. Under normal circumstances, the cash payment will equal or exceed the total price. However, the invention allows the donor to withdraw moneys from a credit balance in one of the accounts recorded in the central computer CC. While unlikely, this may also occur with a credit card sale. Thus, in some situations, the amount of cash may fall short of the total price. In step 114 the cash register determines if the amount of cash exceeds the total price.

If the answer is yes, the cash exceeds the sale price, the register CRx determines the amount of change by subtracting the price from the cash in step 117. If the answer is no, the cash does not exceed the sale price the register determines the amount due in step 120. In step 124, the cash register CRx asks whether the customer has and wishes to use a donor card. The clerk or customer may respond by keyboard, or directly by entering the donor card into the card reader CDx.

If the customer does not have or does not wish to use a donor card in response to step 124, the cash register CRx prints the transaction in step 127 and, in step 130, prompts the clerk to make change or collect more cash. If the customer does not offer any needed cash the clerk must abort or otherwise correct the transaction.

If the customer wishes to use a donor card, the clerk may enter this information into the register's keyboard, or the customer may enter the card into the card reader CDx. In step 134, the register communicates with the central computer, and the two read the donor card. In step 137 of FIG. 4A, the computer CC determines whether the card is valid. If not, the register CRx returns to step 127.

Figure 4A:
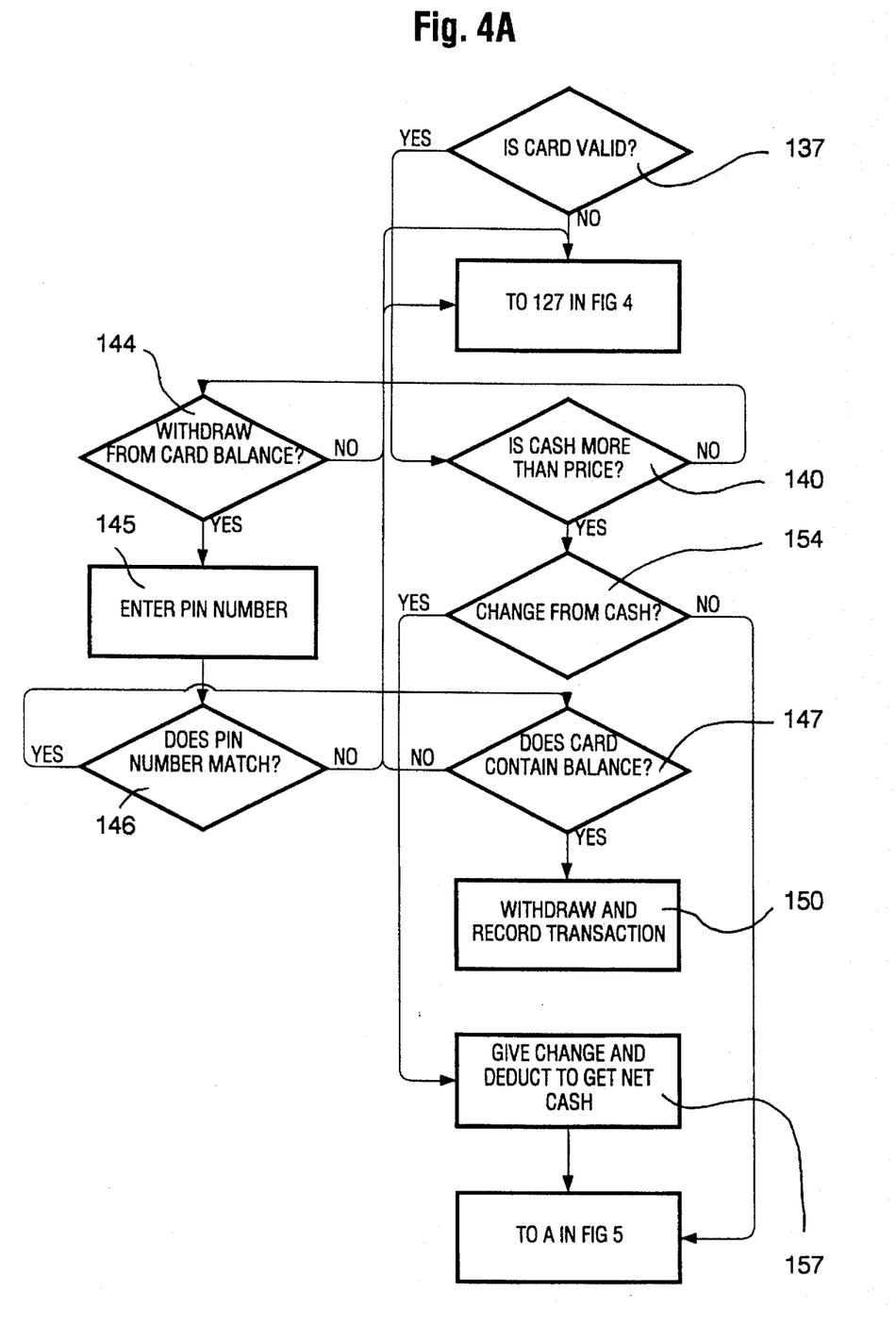

If the card is valid, the cash register CRx again asks if the cash offered exceeds the total price in step 140. If not, in step 144, the computer CC and the cash register CRx prompts the cash register CRx display DI to ask if the cash register should debit the deficient amount from one of the donor cardholder's accounts. If not, the process returns to step 127 in FIG. 4.

If the answer to step 144 is yes, the computer CC, in step 145, asks the customer to enter his or her personal identification (PIN) number. In step 146, the computer CC determines if the PIN number matches the card number. If not the computer returns to step 127. If yes, in step 147 it determines if the card contains a sufficient balance to cover the amount due. If not, the process again returns to step 127. If yes, in step 150, the computer withdraws the money from the donor account and credits it to the account of the establishment or the sponsor SPx as pre-programmed. In step 150, the cash register CRx also prints out the transaction.

If the answer to step 140, namely to the question whether there is more cash than the price, is yes, step 154 causes the cash register CRx to display a message asking whether the customer wishes to retain some of the change due. If yes, the cash register CRx and the computer CC prompt the customer to enter in the keypad KPx how much he or she wish to retain or donate. In step 157, the cash register CRx indicates to the clerk to give the appropriate net change and shows the net donor amount.

Figure 5:
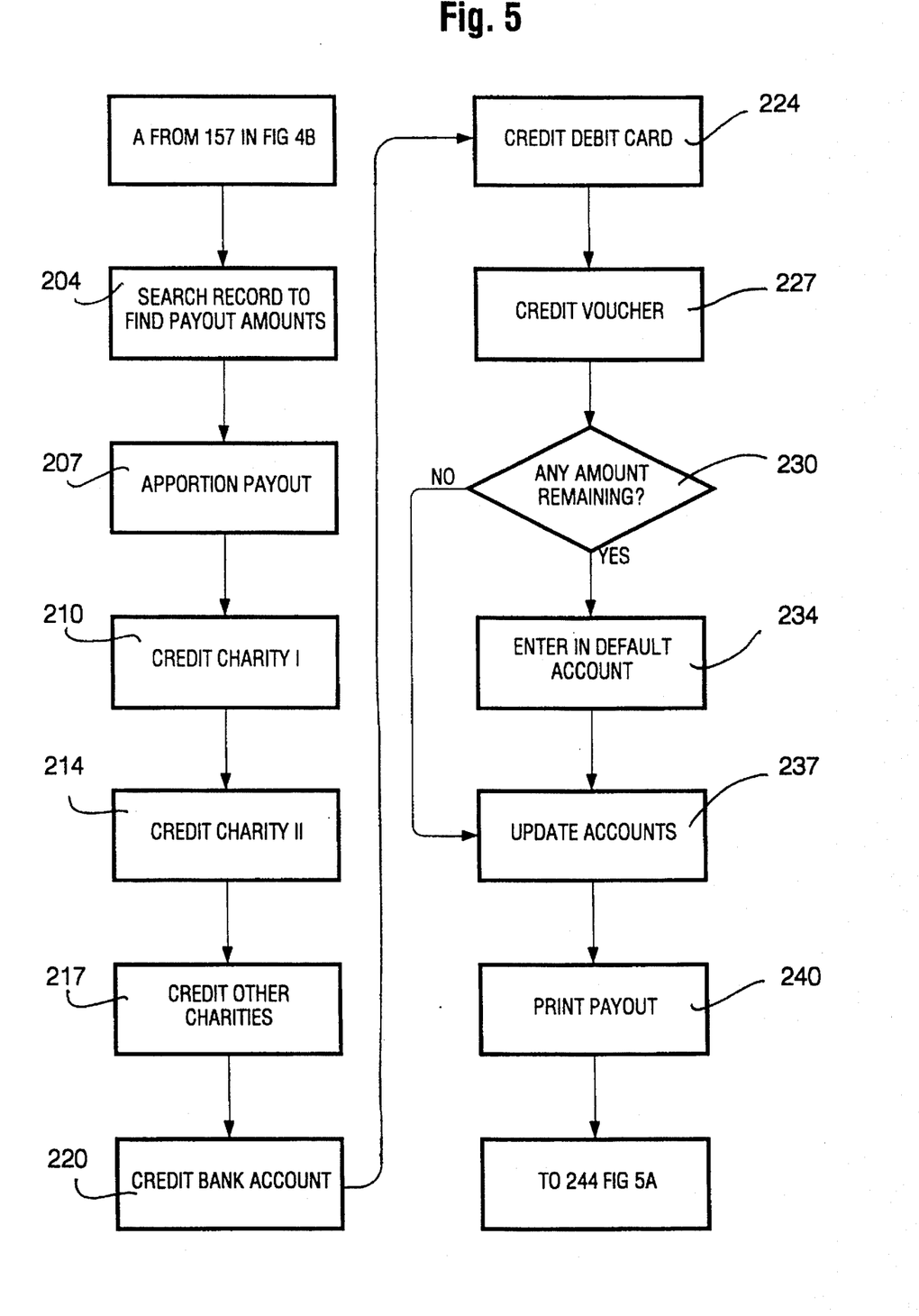

The process now goes to A in FIG. 5. If the answer to step 154 is no, the process also continues at point A in FIG. 5.

Figure 6:
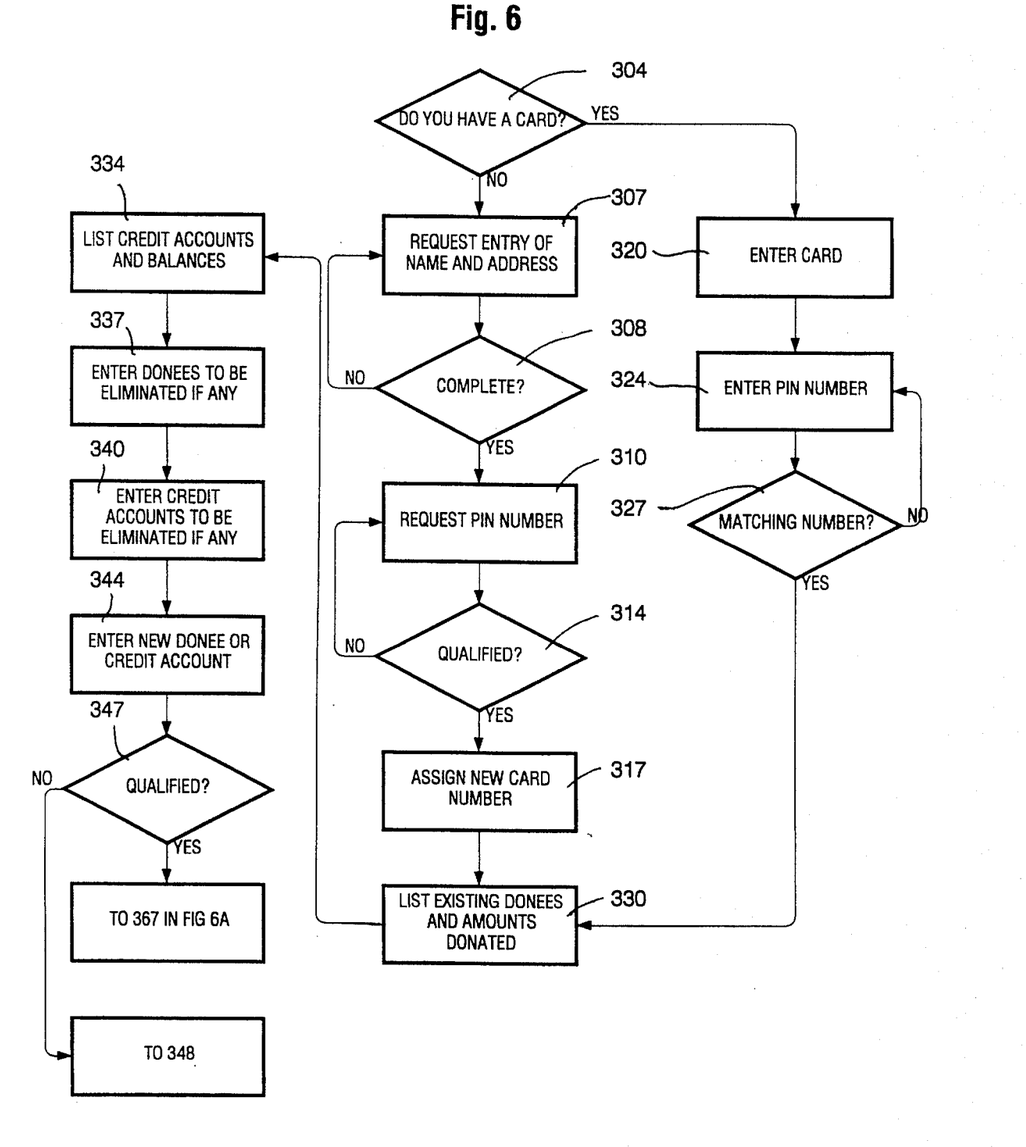
FIGS. 6, 6A are another flow diagram of steps that take place in a computer in FIG. 1.

At A, step 204, in FIG. 5, the computer CC searches the records to find the pre-programmed payout amounts for the particular donor card. The payout amounts are entered as shown in FIG. 6. In step 207 of FIG. 5, the computer CC starts apportioning the payout amounts in the pre-programmed proportions or priorities and amounts. In steps 210 to 227 it enters the selected amounts in the accounts of various charities, banks, debit card, and vouchers. Normally there should be no remaining amount. However such an amount may exist. Thus in stp 230 the computer CC asks if there remains any outstanding amount. If yes, step 234 enters it into a default account selected by the donor at an earlier time. In step 237, the computer CC updates the accounts both in its own data banks and in the computers CHy and OTz. The computers CHy and OTz confirm the transactions.

In a preferred embodiment, the computer CC transfers and credits charity donations to a charity account or to the charities CHy with each transaction. Hence the donation takes effect with each transaction.

If the answer to step 230 is no, there are outstanding amounts, the process goes to step 237 directly. In step 240, the cash register CRx prints out the amounts donated, entered into various accounts, the prices, the change, etc.

Figure 5A:
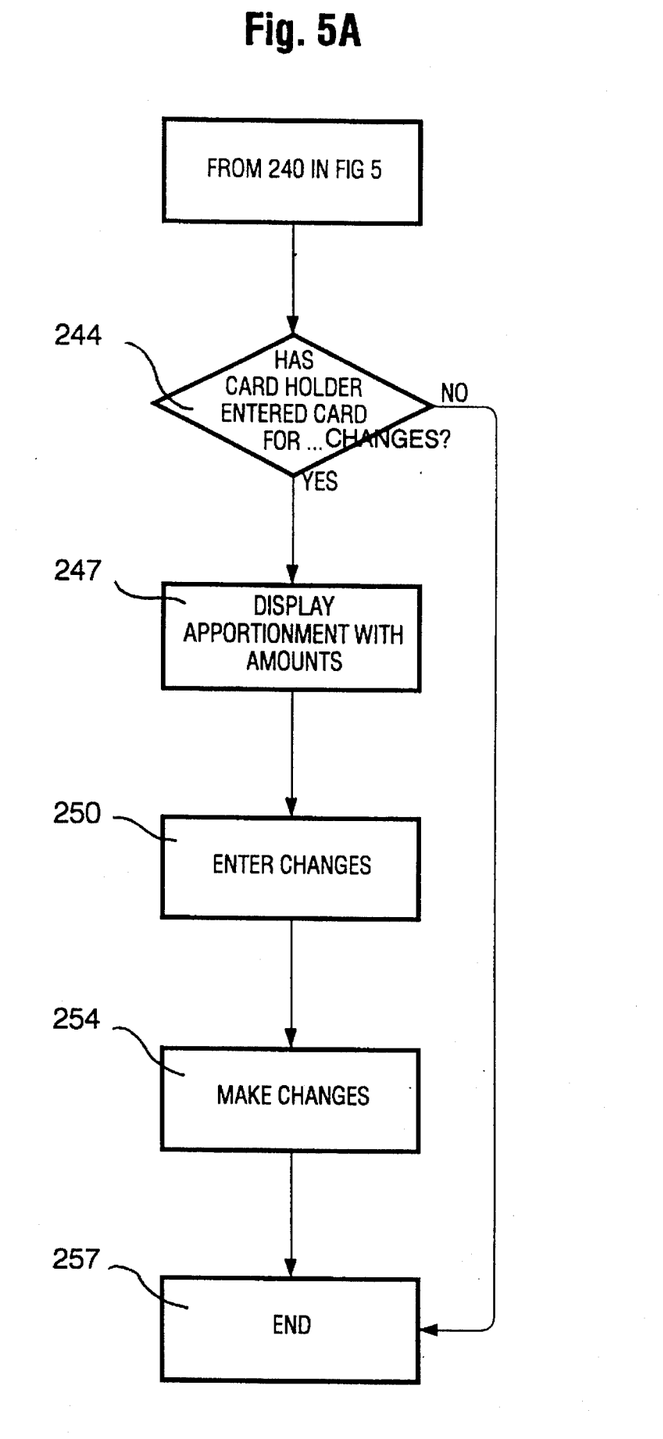

In step 244 of FIG. 5A, the computer CC and the cash register CRx then prompt the customer to ask if he or she wishes to change the programming of the various donations in the computer CC. If yes, the card reader CDx displays the apportionment and the amounts, including balances in step 247, the consumer then enters the desired changes in step 250, and the computer CC makes the changes in step 254. This ends the transaction in step 257. If the answer to step 244 is no, the process goes directly to step 257.

In one embodiment of the invention, the consumer carries out steps 244 to 254 at a separate time in a separate card reader CDx and keypad KPx. This prevents the consumer from using these machines while the clerk serves another customer. In fact, the establishment may furnish a separate terminal RTx just for this purpose.

Figure 6A:
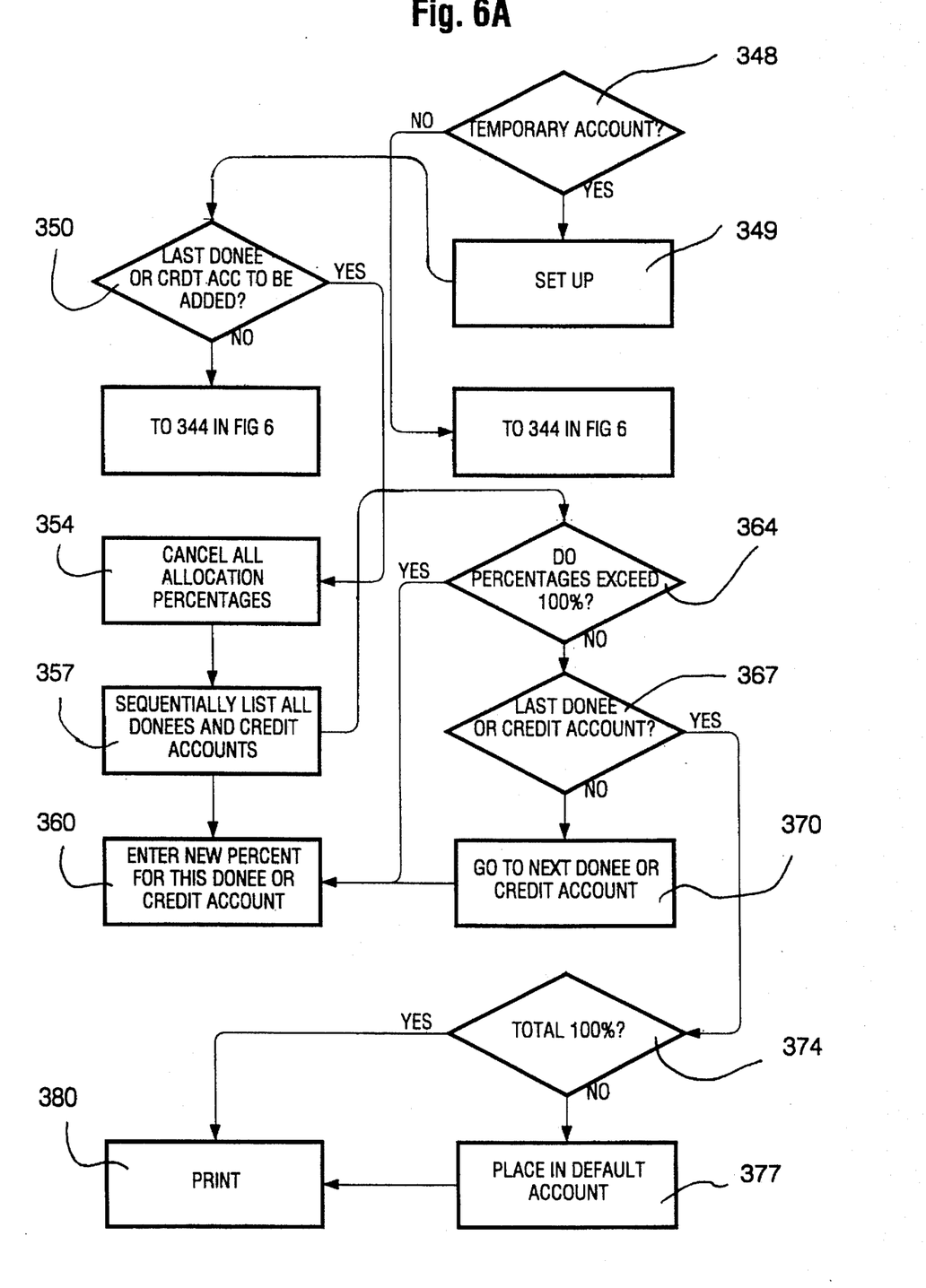

FIGS. 6 and 6A are consecutive flow charts which illustrate the steps which the computer CC takes, through the keypad KPx, to open or revise donor account or credit account data in a new or existing card account. A display DSx on the keypad KPx or the cash register CRx allows the computer CC to ask the consumer to perform certain acts. After the party has accessed the computer CC the computer, in step 304, asks whether the consumer has a donor card. If not, in step 307, the computer CC asks the consumer to enter his or her name or address. In step 308, the computer CC determines if all information has been entered. If not, it returns to step 307 to ask again for the desired information. If yes, the computer CC proceeds to step 310 to ask the consumer to choose a personal identification (PIN) number. In step 314, the computer determines if the PIN number is acceptable. If not it returns to step 310 for another number. If yes, the computer advances to step 317 to assign a new card number.

If the answer in step 304 is yes, that the consumer has a card, the computer CC proceeds to step 320 to have the customer enter the card. In step 324, it asks the consumer to enter his or her preselected PIN number. In step 327 it determines whether the entered PIN number matches the preselected PIN number. If not, it returns to step 324 for a corrected number. The computer allows this procedure between steps 324 and 327 recur only three times, thereafter it aborts the program.

If the PIN number is correct and thereby qualified, the computer CC, in step 330 lists all existing donees and amounts donated during any specific time period, such as the calendar year. The consumer may request any time period. In step 334, it also lists all credit accounts with balances. In step 337 it asks the consumer to list all donee accounts to be eliminated, if any. In step 340 it asks the consumer to list all credit accounts to be eliminated if any. The computer then proceeds to step 344. Step 344 also receives a prompt from stem 317 if the card number is new.

In step 344, the computer asks the consumer to enter any new donee account or credit account. In step 347, it determines if the donee, in the form of a charity, or credit institution, is in the list of charities or institutions that have been accepted by the system. If the answer is no, the computer, in step 348 asks if the consumer wishes to have a temporary account set up for that donee or credit institution pending investigation. If yes to step 348, the computer, in step 349, sets up a temporary account, and lists it as qualified pending investigation. If the answer to 348 is no, the computer CC goes back to step 347.

Once the computer CC has qualified a donee or credit institution, it goes to step 350 to ask if this is the last donee account or credit account the consumer wishes to add. If not the process goes back to step 344. If yes, the computer cancels all prior allocations in step 354 and, in step, 357, sequentially lists all remaining and new donee account and credit accounts showing the old allocations where applicable. In step 360, it asks the consumer to enter a new percentage allocation for each account. As a check, in step 364, the computer asks if the total percentages exceed 100%. If yes, it returns to step 360 for a new entry. If not, it proceeds to step 367 to ask if this is the last account. If not it goes to step 370 to ask the consumer to go to the next account and returns to step 360. If yes, the computer CC goes to step 374 where it asks if the total percentage is 100%. If not, the computer CC places the remaining percentage in a consumer's personal default account asks the consumer to select an account and change to allocations in step 377. The computer, in step 380, ends the process and has the keypad print out the results.

According to an embodiment of the invention, the computer CC demands a PIN number each time the card is used. In another embodiment, the computer may permit others to donate in behalf of the card owner, such as a parent contributing for a child. In that case step 124 permits entry only of the card number without the card.

In some instances, when the amount of cash is less; than the price, the sales establishment or customer may want to abort the sale. Then, at step 117, the cash register CRx asks whether to abort. If yes, the process must start again at step 104.

The invention contrasts with present day situations in which a clerk inputs the price of all items in the cash register and the latter totals the price. The consumer offers either the exact amount of cash or a sum exceeding the price, and the clerk enters that amount. The cash register then subtracts the price from the cash.

According to the invention, the clerk also inputs the price of all items in the cash register and the latter totals the price. The consumer still offers either the exact amount of cash or a sum exceeding the price, and the clerk enters that amount. The cash register then subtracts the price from the cash. However, then the consumer enters the donor card number with its bar code or magnetic stripe. The register then contacts the remote processing unit and the latter allocates the change according to the preprogrammed commands which the consumer has previously entered. The consumer receives a printout of all donor transactions as well as the just-completed commercial transaction.

If desired, the consumer can choose to donate only a fraction of the difference between the cash presented and the price. The consumer then enters the amount to be donated and receives the appropriate cash change.

Prior to listing in the central processor, the invention qualifies each charity for their tax exempt status, operations, management activities, litigation, and other pertinent legal and financial information. The charity must certify to the facts. If the reported information meets the requirement, the charity qualifies. The computer initiates a checking and updating of the qualification facts on a regular basis. The central processor the keeps the qualified charities on an ongoing basis.

The register furnishes the donor a printed receipt of each donor transaction for tax purposes and authentication that the charity will receive the money. The receipt shows the serial number, amount donated, date, total donated by the donor, and the current financial results of any specific campaigns or project received by the charity overall.

One embodiment of the invention furnishes other rewards to the donor. For example, the terminal may play a tune, such as "It's a Small World" in response to donation to the United Nations children's fund. Alternatively the donor may receive a message that the last ten cent donation has; closed another $100 unit in donations to this charity and provide a special discount coupon. As another example the donor may receive a message that the donor's contribution is being matched by a sponsor with a bonus donation.

The invention supervises, implements, and coordinates charitable contributions to benefit all participants in the giving cycle, including the donors, sponsors, charitable organizations, Internal Revenue Service, and end recipients. It allows remote receiving and sending stations, connected to a central processing station, to accept any denomination of giving from a single penny to unlimited dollars. Regardless of the size of the donation, it effectively warrants that all participants that the designated charity has received the donated funds. It thus supports the authenticity of each donation. It can offer unlimited access to the donors concerning their contributions to charities and savings accounts, the intended use of the funds, and feedback concerning the total received by the funds.

The invention effectively leverages the power of mere pennies into substantial dollars that in turn become available to charities on a short term collection basis. It rewards and encourages philanthropic giving and savings to all individuals on an every day basis.

While embodiments of the invention have been described in detail, it will be evident to those skilled in the art that the invention may be embodied otherwise without departing from its spirit and scope.

What is claimed is:

1. A system, comprising:

a cash register;

entry means in the cash register for entering an amount corresponding to a price of a product into the cash register and for entering an amount corresponding to cash being paid;

calculating means in the cash register for determining existence of an excess cash payment;

card identifier entering means for entering a card identifier, said card identifier identifying one or a plurality of predetermined accounts;

apportioning means responsive to said register and said card identifier entering means for apportioning at least a part of the excess cash payment among a number of predetermined accounts identified with said card; and said accounts being identified independent of data in the register.

2. A system as in claim 1, wherein said cash register includes change making means for returning remains from an excess payment, after apportionment, as cash.

3. A system as in claim 2, wherein said cash register includes a display for displaying the excess cash and the remains.

4. A system as in claim 1, wherein said card identifier entering means includes means for entering changes in the apportionment.

5. A system as in claim 1, wherein said apportioning means includes means for allocating a portion of the excess to charity donee accounts with each apportionment.

6. A system as in claim 5, wherein said apportioning means includes means for transferring the portion of the excess for the charity donee account directly to the charity donee with each apportionment.

7. A system as in claim 1, wherein said apportionment means includes:

charity storage means for storing names of a plurality of qualified charities;

bank storage means for storing names of a number of banks;

account storage means for storing numbers of client accounts;

entry means for entering the names of charities and banks so as to establish an entered name for each entry of a name;

comparison means responsive to said storage means and said entry means for comparing each entered name with a stored name to determine if the entered name matches a stored name;

assignment means responsive to said comparison means for assigning a charity or a bank to an account when the charity or the bank has been entered;

recording means responsive to said account storage means for recording money entries into said accounts; and allocating means responsive to said account storage means for registering an allocation of parts of monies recorded into accounts among the charities and banks entered for that account.

8. A system as in claim 1, wherein said apportioning means includes a central processor remote from the register for receiving the data from the card identifier entering means.

9. A system as in claim 8, wherein central processor remote from the register serves for receiving the data from the card identifier entering means on a real time basis.

10. A system as in claim 1, wherein said card identifier entering means includes receiving means for receiving a card having the number and data including the accounts and instructions for apportioning, and said apportioning means further includes means for receiving the data from the card.

11. A system as in claim 10, wherein said apportioning means includes a central processor remote from the register for receiving the data from the card number entering means on a batch processing basis.

12. A system as in claim 1, further comprising printout means coupled to said register, said card entering means, and said apportioning means for printing out the amounts entered and apportioned.

13. A system as in claim 12, wherein said printout means prints out the status of each of the accounts.

14. A system as in claim 1, wherein the card identifies the relationship of apportioning among accounts independent of the of data in the cash register.

15. An apportionment system, comprising:

deducting means for deducting a cost of an item from a payment received to determine an excess;

charity storage means for storing the names of a plurality of qualified charities;

bank storage means for storing the names of a number of banks;

account storage means for storing numbers of client accounts;

entry means for entering names of charities and banks so as to define an entered name for each entry of a name;

comparison means responsive to each of said storage means for comparing the entered names with the stored names to determine if the entered name matches a stored name;

assignment means responsive to said comparison means for assigning a charity or a bank to an account when a client has selected the charity or the bank;

recording means for responsive to each of said account storage means recording money entries into said accounts; and allocating means responsive to said deducting means and said account storage means for registering an allocation of parts of the excess, after deduction of the cost, among the charities and banks entered for that account;

each of said storage means, entry means, comparison means, assignment means, and recording means, being independent of said deducting means.

16. A point of sale operating method, comprising:

entering an amount corresponding to a price of a product into a cash register;

entering an amount corresponding to cash being paid;

determining any excess cash payment;

entering a card identifier;

apportioning at least a part of the excess cash payment among one or more of a number of predetermined accounts as determined by the card identifier; and crediting the excess paid to the accounts to the card identifier;

the predetermined accounts being identified with said card identifier independent of said cash register.

17. A system as in claim 16, wherein said apportioning step includes making change for returning any remains from the excess payment, after apportionment, as cash.

18. A system as in claim 17, wherein said printing step includes displaying the excess cash and the remains.

19. A method as in claim 16, wherein said printout step includes printing out the status of each of the accounts.

20. A method as in claim 16, wherein said step of apportioning includes entering changes in the apportionment.

21. A method as in claim 16, wherein said step of apportioning includes allocating a portion of the excess to charity donee accounts with each apportionment.

22. A method as in claim 21, wherein said apportioning step includes transferring a portion of the excess for the charity donee account directly to the charity donee with each apportionment.

23. A method as in claim 16, wherein said apportionment step includes:

storing names of a plurality of qualified charities;

storing names of a number of banks;

storing number of client accounts;

entering the names of charities and banks so as to define an entered name for each entry of a name;

comparing each entered with a stored name to determine if the entered name matches the stored name;

assigning a charity or bank to an account when a charity or bank has been entered;

recording money entries into set accounts;

registering an allocation of parts of monies recorded into accounts among charities and banks entered for that account.

24. A method as in claim 16, wherein the relationship of apportionment among accounts is identified by the card identifier independent of data in the cash register.

25. A method as in claim 24, further comprising the step of printing out the amounts entered and apportioned.

26. A method as in claim 24, wherein the card identifies the relationship of apportioning among accounts independent of data in the cash register.

27. A method as in claim 16, wherein further comprising the step of receiving the data from the card identifier entering means in a central processor remote from the register.

28. A method as in claim 16, wherein the step of entering includes receiving a card having the card identifier and data including the accounts and instructions for apportioning, and said apportioning step further includes receiving the data from the card.

29. A method as in claim 28, wherein said apportioning step includes receiving in a central processor remote from the register data entered from the card on a batch processing basis.

30. A method as in claim 29, wherein the step of receiving data from in the central processor remote from the register includes receiving the data from the card number entering means on a real time basis.

* * * * *